United States Patent
Abraham et al.

(10) Patent No.: US 9,843,995 B2
(45) Date of Patent: Dec. 12, 2017

(54) METHOD AND METRICS FOR MERGING WITH A NEIGHBORHOOD AWARE NETWORK

(71) Applicant: QUALCOMM Incorporated, San Diego, CA (US)

(72) Inventors: Santosh Paul Abraham, San Diego, CA (US); George Cherian, San Diego, CA (US); Alireza Raissinia, Monte Sereno, CA (US); Guido Robert Frederiks, Aptos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 14/274,412

(22) Filed: May 9, 2014

(65) Prior Publication Data
US 2014/0341073 A1    Nov. 20, 2014

Related U.S. Application Data

(60) Provisional application No. 61/823,852, filed on May 15, 2013.

(51) Int. Cl.
*H04W 48/18* (2009.01)
*H04W 48/16* (2009.01)
(Continued)

(52) U.S. Cl.
CPC ........... *H04W 48/18* (2013.01); *H04W 8/005* (2013.01); *H04W 48/16* (2013.01);
(Continued)

(58) Field of Classification Search
None
See application file for complete search history.

(56) References Cited

U.S. PATENT DOCUMENTS

2004/0170191 A1*  9/2004  Guo ................. H04W 36/0088
                                                        370/468
2004/0229621 A1   11/2004  Misra
(Continued)

FOREIGN PATENT DOCUMENTS

| GB | 2411548 A | 8/2005 |
|---|---|---|
| WO | WO-2010006100 A1 | 1/2010 |

(Continued)

OTHER PUBLICATIONS

International Search Report and Written Opinion—PCT/US2014/037644—ISA/EPO—Oct. 22, 2014.
Taiwan Search Report—TW103117169—TIPO—Jan. 25, 2016.

*Primary Examiner* — Anez Ebrahim
(74) *Attorney, Agent, or Firm* — Knobbe, Martens, Olson & Bear, LLP

(57) ABSTRACT

Methods, apparatuses, and computer program products for the selection, identification, and comparison of metrics used by a wireless device within range of a plurality of wireless communication systems, such as neighborhood aware networks, to determine which wireless communication system provides the desired capabilities and services. These metrics can be dynamically selected by a device and implemented for software decision making as additional wireless communication systems with new, different, or better characteristics fall within range of a given wireless device.

31 Claims, 5 Drawing Sheets

(51) Int. Cl.
*H04W 56/00* (2009.01)
*H04W 8/00* (2009.01)
H04W 84/18 (2009.01)
H04L 29/08 (2006.01)

(52) U.S. Cl.
CPC ....... *H04W 56/001* (2013.01); *H04L 67/1061* (2013.01); *H04L 67/16* (2013.01); *H04W 84/18* (2013.01)

(56) References Cited

U.S. PATENT DOCUMENTS

| | | | |
|---|---|---|---|
| 2008/0102838 A1 | 5/2008 | Takai | |
| 2008/0160989 A1* | 7/2008 | Favre | H04W 36/36 455/424 |
| 2008/0188194 A1 | 8/2008 | Liu | |
| 2008/0279168 A1 | 11/2008 | Kalhan et al. | |
| 2010/0217655 A1 | 8/2010 | Kuehnel et al. | |
| 2011/0256840 A1* | 10/2011 | Kobayashi | H04W 56/002 455/130 |

FOREIGN PATENT DOCUMENTS

| | | |
|---|---|---|
| WO | WO-2010052523 A1 | 5/2010 |
| WO | WO-2014066534 A1 | 5/2014 |

* cited by examiner

METHOD AND METRICS FOR MERGING WITH A NEIGHBORHOOD AWARE NETWORK

CROSS REFERENCE TO RELATED APPLICATIONS

This application claims priority under 35 U.S.C. §119(e) to U.S. Provisional Patent Application No. 61/823,852, filed May 15, 2013, entitled "METHOD AND METRICS FOR MERGING WITH A NEIGHBORHOOD AWARE NETWORK," which is hereby incorporated by reference in its entirety.

BACKGROUND

Technological Field

The present application relates generally to wireless communications, and more specifically to systems, methods, and devices for synchronization in a peer-to-peer wireless network.

Description of the Related Art

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), a neighborhood aware network (NAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network can transmit and/or receive information to and from each other. To carry out various communications, the devices can coordinate according to a protocol. As such, devices can exchange information to coordinate their activities. Improved systems, methods, and devices for coordinating transmitting and sending communications within a wireless network are desired.

Devices in a wireless network may further be within range of an additional wireless network that provides superior services or functionality. Specifically, a wireless device, such as an exemplary smartphone, can be in communication with a number of NANs within range simultaneously. Accordingly, it would be advantageous to provide a method by which a wireless device in range of more than one NAN is capable of selecting what metrics to use to determine whether to leave a first NAN and/or merge with a second NAN.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the disclosure provides a method for selecting a neighborhood aware network by a wireless device. The method comprises identifying a first metric associated with a first neighborhood aware network for a first service. The method further comprises identifying the first metric associated with a second neighborhood aware network for the first service. The method further comprises comparing the metrics for the first service. The method further comprises selecting the first neighborhood aware network or the second neighborhood aware network based on the comparison for the first service.

Another aspect of the subject matter described in the disclosure provides a wireless communications device configured for performing the selection of an neighborhood aware network. The apparatus comprises a receiver configured to receive information from at least a first neighborhood aware network and a second neighborhood aware network, the information comprising a metric. The device further comprises a processor configured to identify a first metric associated with the first neighborhood aware network for a first service, identify the first metric associated with the second neighborhood aware network for the first service, compare the metrics associated with the first service, and select the first neighborhood aware network or the second first neighborhood aware network based on the comparison for the first service.

Another aspect of the subject matter described in the subject matter described in the disclosure provides an apparatus for selecting a neighborhood aware network. The apparatus comprises means for identifying a first metric associated with a first neighborhood aware network for a first service. The apparatus further comprises means for identifying the first metric associated with a second neighborhood aware network for the first service. The apparatus further comprises means for comparing the metrics for the first service. The apparatus further comprises means for selecting the first neighborhood aware or the second neighborhood aware network based on the comparison for the first service.

Another aspect of the subject matter described in the disclosure provides a non-transitory computer-readable medium including code that, when executed, causes a wireless device to identify the first metric associated with a first neighborhood aware network for a first service, identify the first metric associated with a second neighborhood aware network for the first service, compare the metrics for the first service, and select the first neighborhood aware network or the second neighborhood aware network based on the comparison for the first service.

DETAILED DESCRIPTION

Figure 1A:
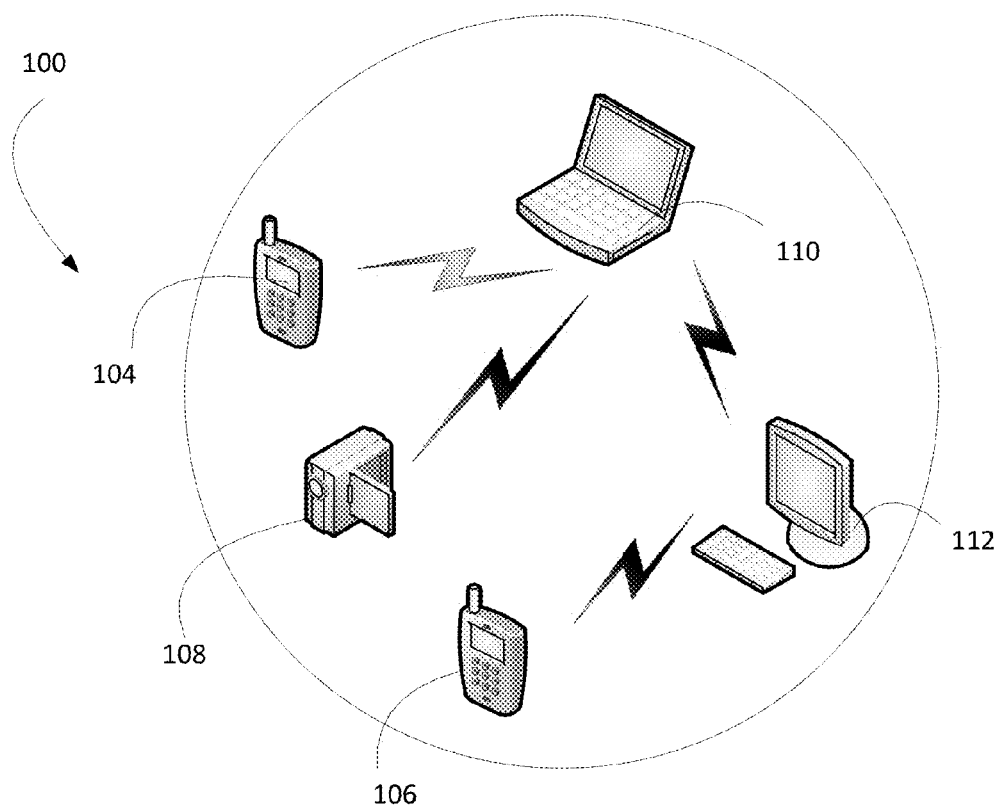
FIG. 1A illustrates an embodiment of a first neighborhood aware network and a second neighborhood aware network according to the disclosure.
Figure 1A:
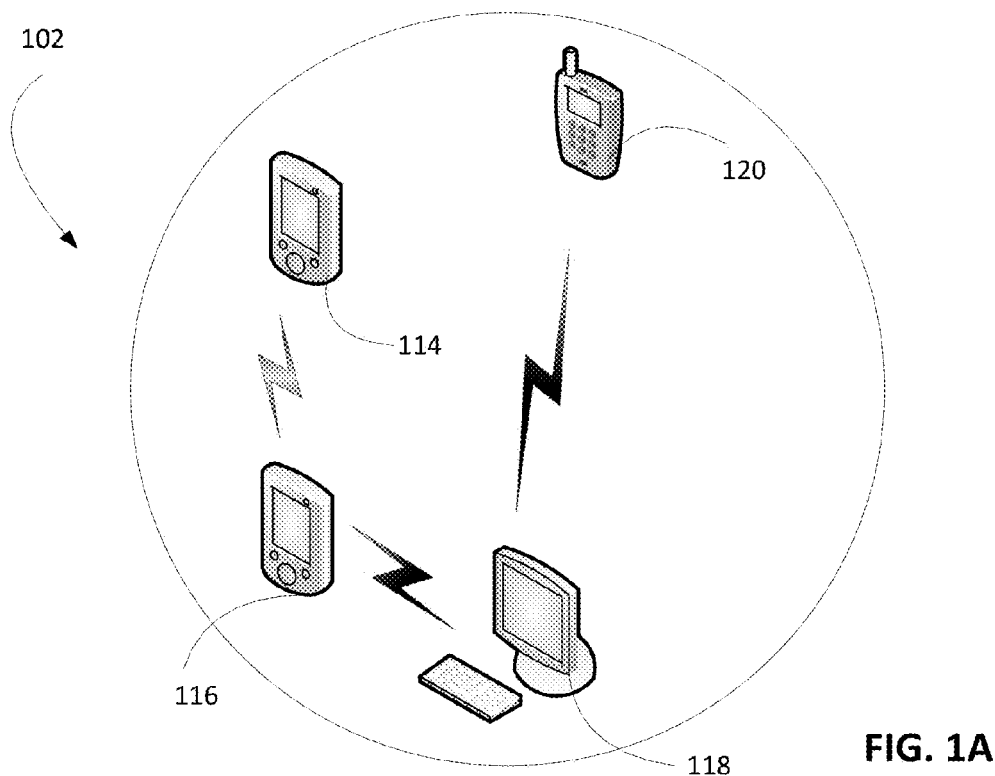

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. However, the various aspects described herein can apply to any communication standard, such as a wireless protocol.

In certain implementations, one or more nodes of a peer-to-peer network can transmit synchronization messages to coordinate one or more availability windows for communication between nodes of the peer-to-peer network. The nodes can also exchange discovery queries and responses to provide for service discovery between devices operating within the same peer-to-peer or neighborhood aware network. A neighborhood aware network ("NAN") can be considered a peer-to-peer network or an ad-hoc network in some aspects. The nodes repeatedly wake from a sleep state to periodically transmit and/or receive synchronization messages and discovery messages.

In some embodiments, only a subset of nodes can be configured to transmit synchronization messages, for example, in order to reduce network congestion. In some embodiments, a subset of nodes can be designated or elected "master" nodes. For example, nodes that have access to an external power source can be elected as master nodes, whereas nodes that run on battery power may not. In some embodiments, one or more master nodes can transmit synchronization messages, while other nodes may not. In some embodiments, one or more nodes in a NAN can elect one or more master nodes based on a dynamically determined or preset master preference number (MPN). For example, nodes with access to an external power source can set their MPN higher (e.g., 10), whereas nodes on battery power can set their MPN lower (e.g., 5). During the election process, nodes having a higher MPN can be more likely to be elected master nodes.

In some implementations, communication systems 100 and 102, can be configured as a WLAN including various devices which are the components that access the wireless network. For example, there can be two types of devices: access points ("APs") and clients (also referred to as stations, or "STAs"). In general, an AP can serve as a hub or base station for the WLAN and a STA serves as a user of the WLAN. For example, a STA can be a laptop computer, a PDA, a mobile phone, etc. In an embodiment, a STA connects to an AP via a WiFi (e.g., IEEE 802.11 protocol) compliant wireless link to obtain general connectivity to the Internet or to other wide area networks. In some implementations a STA can also be used as an AP.

An AP can also include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A STA can also include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal can include a cellular telephone, a cordless telephone, a Session Initiation Protocol ("SIP") phone, a wireless local loop ("WLL") station, a PDA, a handheld device having wireless connection capability, or some other suitable processing device or wireless device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1A illustrates an example of a first wireless communication system 100 and a second wireless communication system 102. The wireless communication system 100 and the wireless communication system 102 may alternatively be referred to herein as the NAN 100 and the NAN 102. The wireless communication systems 100 and 102 can operate pursuant to a wireless standard, such as an 802.11 standard or other applicable standard. The wireless communication systems 100 and 102 shown are set up as exemplary ad hoc peer-to-peer networks, such as a NAN. The NANs 100, 102 may comprise individual wireless devices that may group together, for example, based on certain shared services. NANs may be decentralized networks that do not rely on any pre-existing network infrastructure, with each node having substantially equal status in the network. Accordingly, each node, or wireless device, may participate in routing data within the NAN and may associate with or leave a given NAN as needed.

Each of the NANs 100, 102, and alternatively their individual members, may be capable of providing certain services available to each member (e.g., a wireless device) of the NAN 100, 102. As a non-limiting example, such services may include Global Positioning System (GPS) information, networked gaming services, environmental sensor information (e.g., temperature, barometric pressure, humidity, etc.), social networking, or audio/video messaging, among numerous other services. A wireless device (described below) may become aware of the available services and join one or more NANs in order to participate in the available services. Multiple NANs providing multiple services each may be available to a given wireless device.

As shown, the NAN 100 comprises five associated wireless devices: two smartphones 104 and 106, a wireless-enabled camera 108, a laptop computer 110, and a desktop computer, described herein as a master device 112. Similarly, the NAN 102 comprises four associated wireless devices: PDAs 114 and 116, a desktop computer, described herein as a master device 118, and a smartphone, described herein as wireless device 120. Each of the constituent members of the NAN 100 and the NAN 102 may alternatively be referred to as individual "wireless devices," reflecting the wireless capabilities of each member of the NAN 100 or the NAN 102. Additionally, the number of exemplary wireless devices shown is not intended to be limiting. Each of the NAN 100 and the NAN 102 may comprise virtually any number of included wireless devices subject to the limitations of each system and the wireless architecture or protocol, among other aspects. Furthermore, while only the NAN 100 and the NAN 102 are shown here for simplicity, virtually any number of separate NANs may be present in a given area. The systems and methods disclosed herein are applicable to any such area or architecture.

As shown in FIG. 1A, the NAN 100 operates independently of the NAN 102, having its own internal NAN configuration and membership. The transfer of data among the individual clients and master of each NAN 100 and NAN 102 occurs according to the specified system architecture. However, while the NAN 100 and the NAN 102 are shown as separate entities in FIG. 1A, as discussed below, for example, with respect to FIG. 1B, individual member of the NANs 100, 102, wireless device 120, for example, may fall within range of more than one NAN and may simultaneously desire services from multiple NANs, such as the NAN 100 and the NAN 102.

Figure 1B:
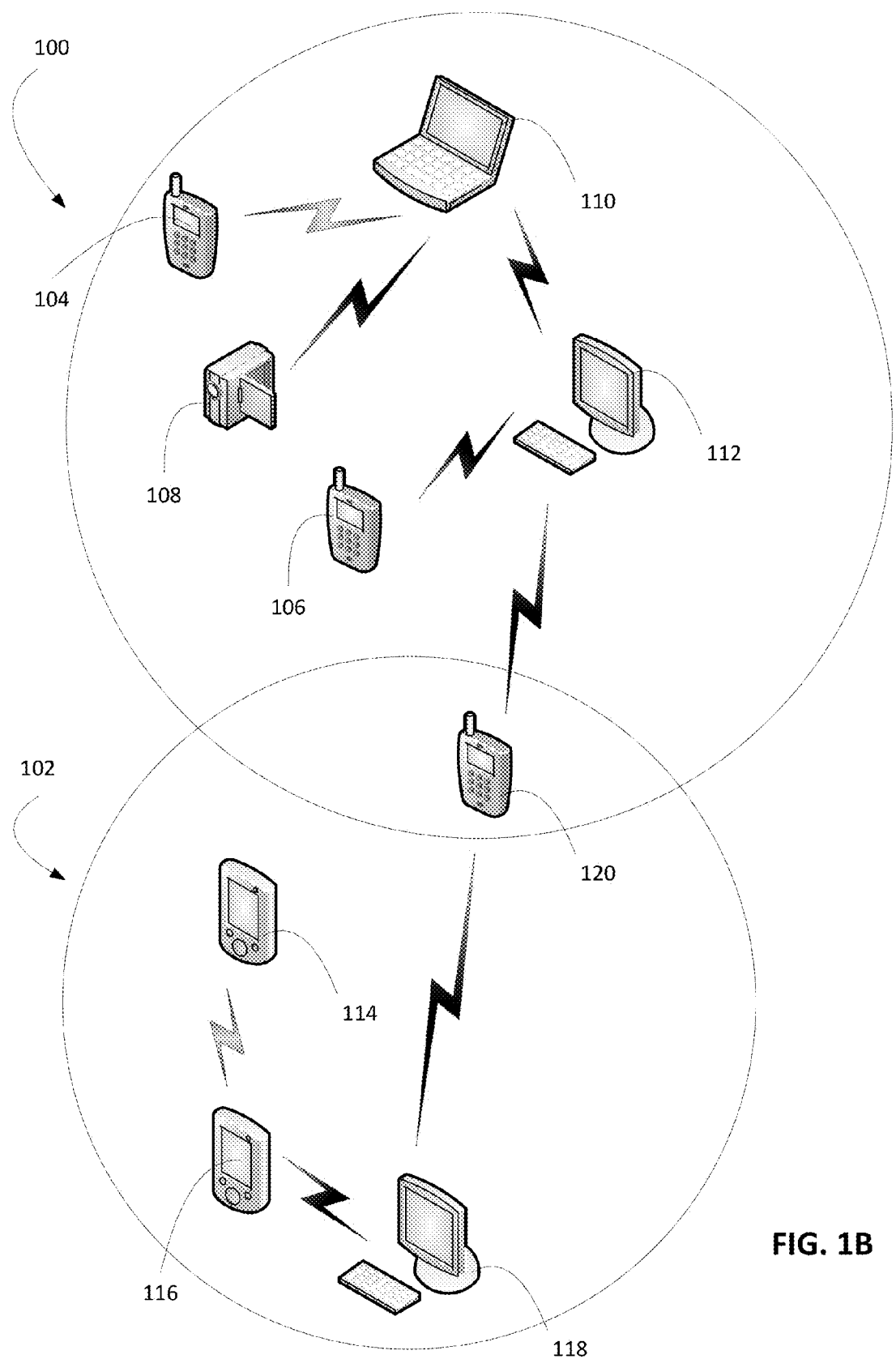
FIG. 1B illustrates another embodiment of a first neighborhood aware network and a second neighborhood aware network according to the disclosure.

FIG. 1B illustrates a variation of the topology of FIG. 1, in which the wireless device 120 is in wireless communication with its current NAN 102, but is also within range of one or more of the members of the NAN 100. In such an embodiment, the wireless device 120 may select which NAN to join, that is, selectively participate in the NAN 100 and/or the NAN 102 based on certain metrics or preferences related to the services desired by the wireless device 120.

Through the method presently disclosed, the wireless device 120, in addition to the various other members of each identified NAN, depicted as the NAN 100 and the NAN 102, is configured to identify specific metrics that allow the wireless device 120 to compare the quality or quantity of services provided by available NANs and select which NAN(s) is/are the preferred NAN(s), predicated on the comparison.

Figure 1C:
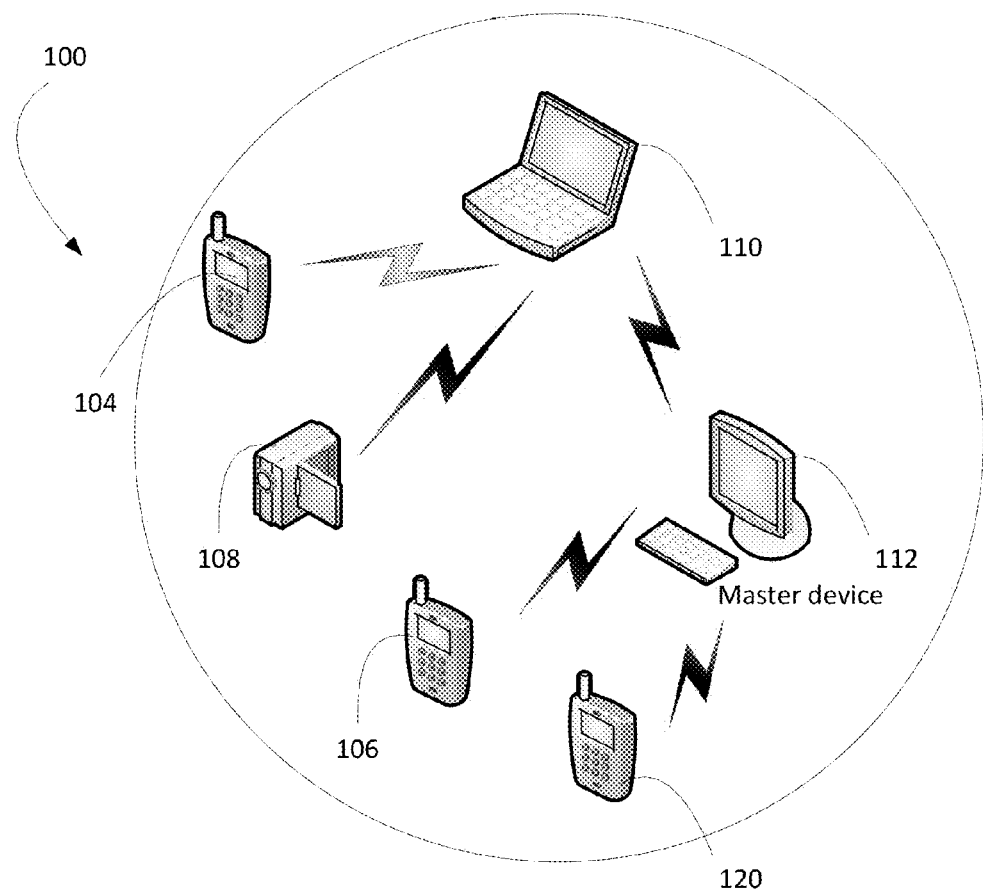
FIG. 1C illustrates an embodiment of a wireless device as it departs a first neighborhood aware network according to the disclosure.
Figure 1C:
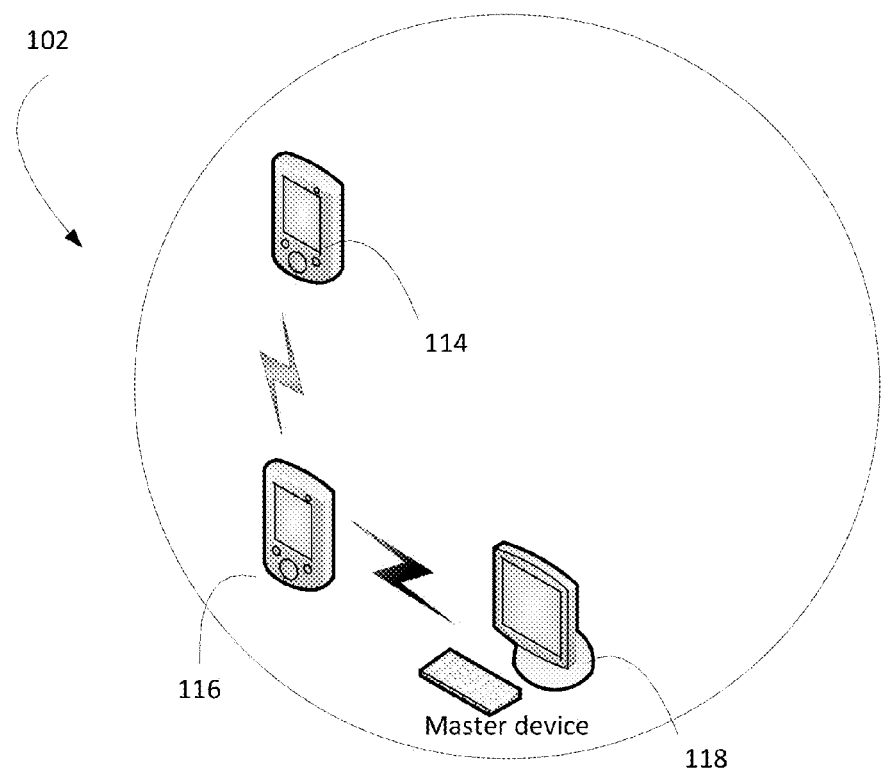

In an embodiment, the wireless device 120 may desire services from multiple NANs. For example, the wireless device may desire services from both the NAN 100 and the NAN 102, in addition to services from other available NANs (not shown). Through the comparison of selected metrics, the wireless device 120 may discover additional or better services than those provided by the current NAN (e.g., NAN 102). As a non-limiting example, the wireless device 120 may select a sensor service from the NAN 100 because the NAN 100 sensor services are superior to the NAN 102 based on a selected metric, discussed below. Additionally, the wireless device 120 may further be capable of also selecting a GPS service from the NAN 102 because the GPS service of the NAN 102 is superior to that of the NAN 100. Accordingly, when the wireless device 120 is capable of participating in multiple NANs, then the wireless device 120 may select at least one NAN (e.g., the 100 or the NAN 102) and participate in the various operations therein. FIG. 1A-FIG. 1C depict only two available NANs, however a wireless device 120 may discover, compare, and/or select as many NANs as required, according to the wireless device 120 capabilities.

FIG. 1C illustrates an embodiment of an exemplary method wherein the wireless device 120 disassociates with, or departs, the NAN 102 and associates with the NAN 100 following a determination that the NAN 100 offers better or different services than the NAN 102. The determination made by wireless device 120 may be based on the disclosed method (discussed below with respect to FIG. 3) of the present disclosure. In an embodiment, the wireless device 120 departs the NAN 102 and subsequently requests to join or otherwise associate with the NAN 100. Alternatively, should the wireless device 120 determine that the NAN 102 provides the desired services or superior services than the available alternative NANs (e.g., the NAN 100), then the wireless device 120 may remain with the NAN 102. The wireless device 120 may further be a member of and participate in multiple NANs (e.g., both the NAN 100 and the NAN 102) according to available services. Accordingly, the wireless device 120 may further compare various different services, selecting from among various NANs providing the desired services, as needed.

An embodiment of the NAN 102 and/or the NAN 100 may comprise the master device 118 and the master device 112, respectively, in addition to multiple non-master, or slave devices. The master device 118 of the NAN 102 or the master device 112 of the NAN 100 may be responsible for continuously transmitting a discovery beacon to advertise services and other required information needed to associate with the respective NAN. Responsibilities as the master device 118 of the NAN 102, depicted as the desktop computer, may also be relinquished during a periodic discovery window of the NAN 102. As such, in an embodiment, the master device 112 or the master device 118 may be required for the proper functioning of a NAN 102. In the embodiment, shown in FIG. 1C, the wireless device 120 is not the master device. Accordingly, the wireless device 120 can begin the procedure to leave (depart) one NAN (e.g., the NAN 102) and join a new NAN (e.g., the NAN 100) at any time, because the wireless device 120 is not required for the proper functioning of the NAN 102. A departing wireless device 120 may indicate its departure by sending a discovery frame with a service ID (e.g., "leaving NAN"), during the discovery window of the NAN 102 to indicate its departure to the other members of the cluster.

In an embodiment, if the wireless device 120 is the master device on the other hand (not shown in this figure), the wireless device 120 would normally continue transmitting discovery beacons for all of the current members of the NAN 102 until the next discovery window, at which point the wireless device 120 could relinquish master device responsibilities and transition to a non-master role. In an embodiment, another wireless device (e.g., wireless devices 114, 116) would then automatically assume the role as the master device. The wireless device 120 may then depart from the NAN 102 by sending a discovery frame notifying the remaining members of the NAN 102 during the discovery window.

In an embodiment, following departure from the NAN 102 for example, the wireless device 120 may enter a power save mode temporarily, waking up during the discovery window of the new NAN 100. During the next discovery window of the NAN 100, the wireless device 120 may receive a beacon including a synchronization message (not shown), from the master device 112 of the NAN 100 (shown as a desktop computer). Following reception of the synchronization message of NAN 100, the wireless device 120 may readjust its time synchronization frame to align with the clock of the new NAN 100. The wireless device 120 may then be free to participate in publish-subscribe operations or other pertinent actions of the new NAN 100. Accordingly, the term "participate" may be used herein to describe the operations of the wireless device 120 in association with other wireless devices, access points, mobile terminals, etc., within an exemplary NAN (e.g., NAN 100, NAN 102). Additionally, while the master device 112 is depicted as a desktop computer, this should not be considered limiting as virtually any device capable of wireless communications can be selected as a master device.

Figure 2:
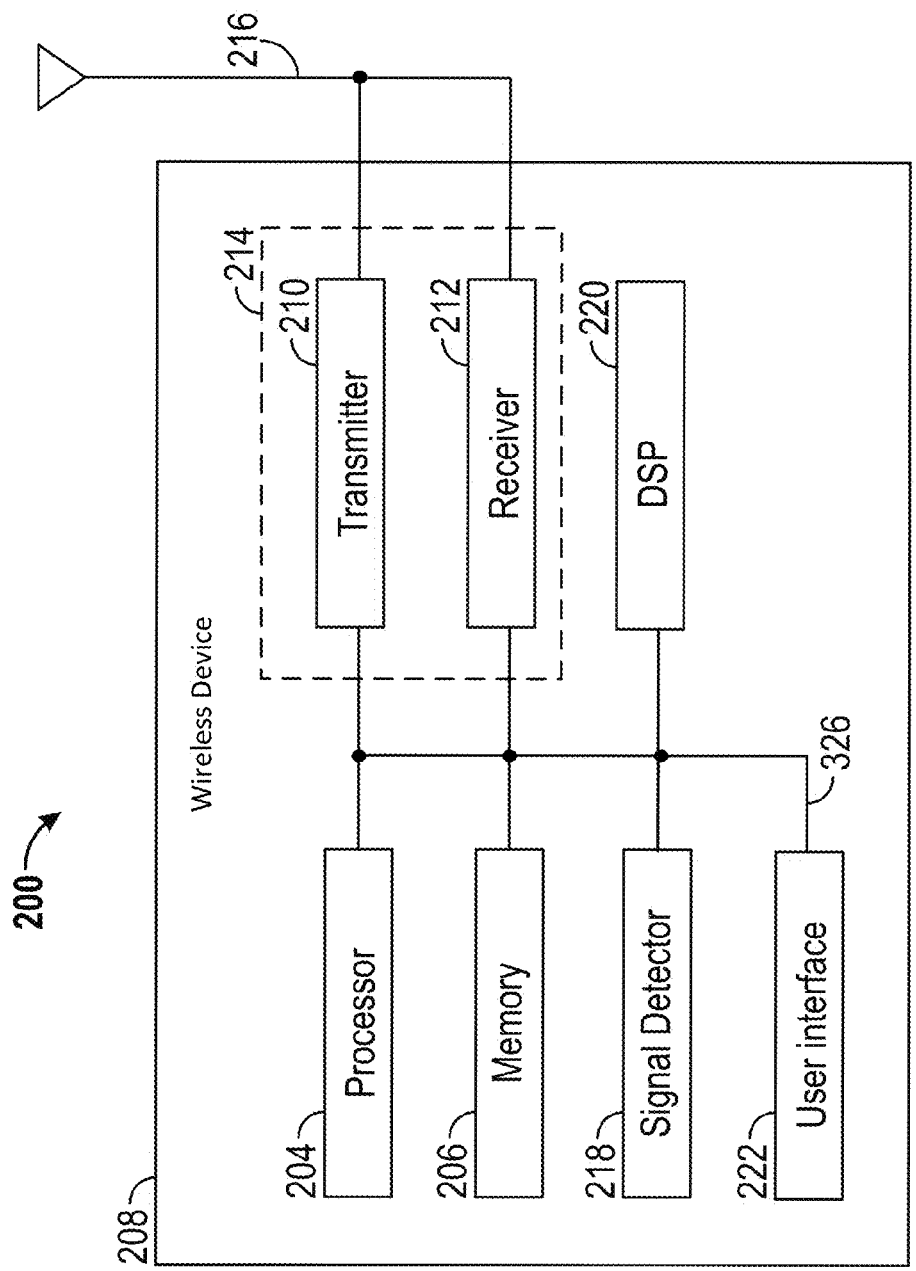
FIG. 2 illustrates a functional block diagram of a wireless device according to the disclosure.

FIG. 2 illustrates various components that can be utilized in a wireless device 200 that can be employed within the NAN 100 or the NAN 102. The wireless device 200 is an example of a device that can be configured to implement the various methods described herein. For example, the wireless device 200 can be implemented within a wireless device 120 and configured to execute the processes described by FIG. 3 below, for example. The wireless device 200 can include a processor 204 that controls operation of the wireless device 200. The processor 204 can also be referred to as a central processing unit ("CPU"). Memory 206, which can include both read-only memory ("ROM") and random access memory ("RAM"), can provide instructions and data to the processor 204. A portion of the memory 206 can also include non-volatile random access memory ("NVRAM"). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors ("DSPs"), field programmable gate array ("FPGAs"), programmable logic devices ("PLDs"), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein, such as that of method 300.

The wireless device 200 can also include a housing 208 that can include a transmitter 210 and/or a receiver 212 to allow transmission and reception of data between the wireless device 200 and a remote location. The transmitter 210 and receiver 212 can be combined into a transceiver 214. An antenna 216 can be attached to the housing 208 and electrically coupled to the transceiver 214. The wireless device 200 can also include (not shown) multiple transmitters, multiple receivers, multiple transceivers, and/or multiple antennas.

The transmitter 210 can be configured to wirelessly transmit packets having different packet types or functions. For example, the transmitter 210 can be configured to transmit packets of different types generated by the processor 204. Additionally, the processor 204 can be configured to determine the type of packet and to process the packet and/or fields of the packet accordingly. When the wireless device 200 is implemented or used as an AP (not shown), the processor 204 can also be configured to select and generate one of a plurality of packet types. For example, the processor 204 can be configured to generate a discovery packet including a discovery message and to determine what type of packet information to use in a particular instance.

The receiver 212 can be configured to wirelessly receive packets having different packet types. In some aspects, the receiver 212 can be configured to detect a type of a packet used and to process the packet accordingly.

The wireless device 200 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 200 can also include a digital signal processor ("DSP") 220 for use in processing signals. The DSP 220 can be configured to generate a packet for transmission. In some aspects, the packet can include a physical layer data unit ("PPDU").

The wireless device 202 can further include a user interface 222 in some aspects. The user interface 222 can include a keypad, a microphone, a speaker, and/or a display. The user interface 222 can include any element or component that conveys information to a user of the wireless device 200 and/or receives input from the user.

The various components of the wireless device 200 can be coupled together by a bus system 226. The bus system 226 can include a data bus, for example, as well as a power bus, a control signal bus, and a status signal bus in addition to the data bus. The components of the wireless device 200 can be coupled together or accept or provide inputs to each other using some other mechanism.

Although a number of separate components are illustrated in FIG. 2, one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

Figure 3:
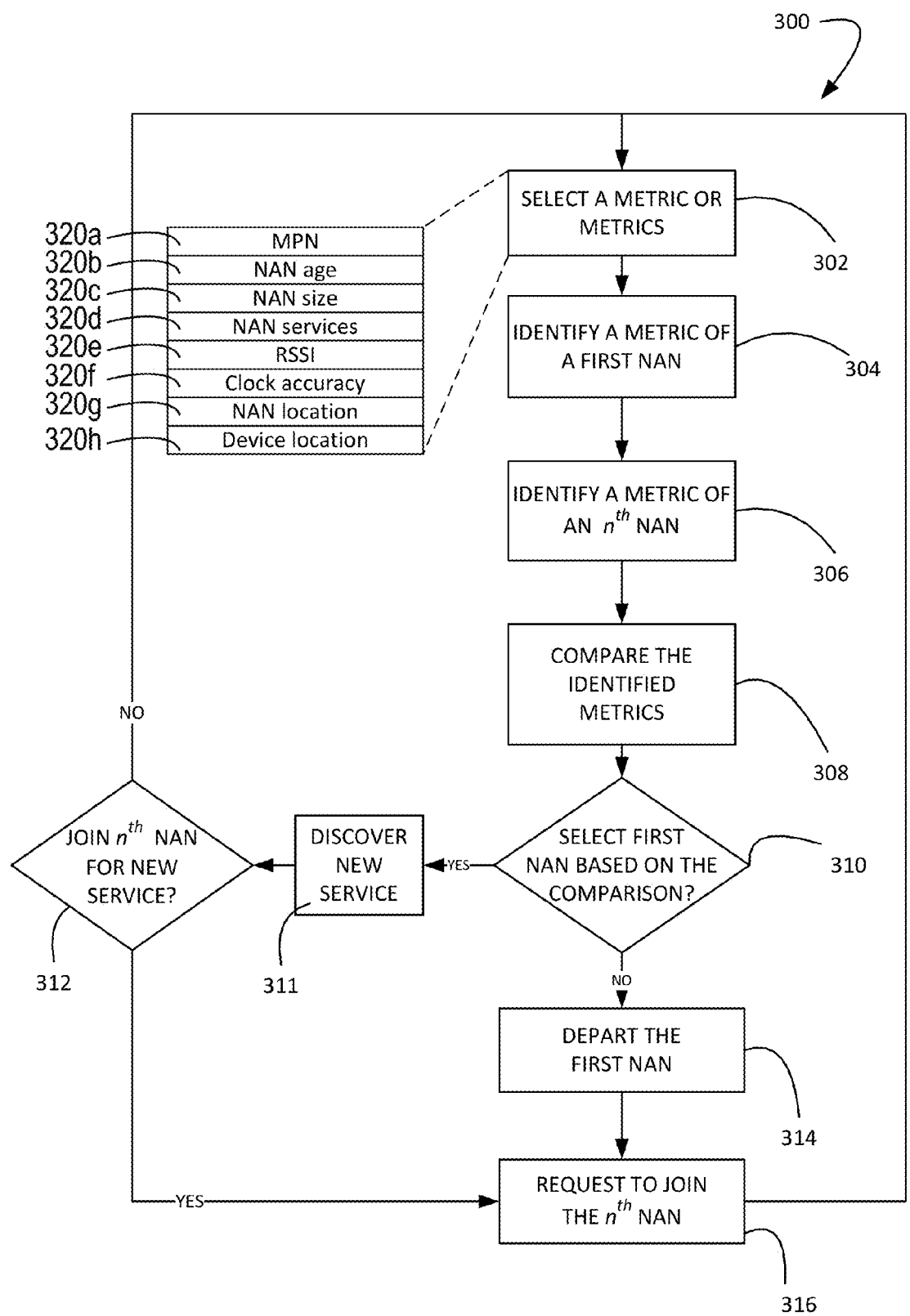
FIG. 3 shows a flowchart of a method according to the disclosure.

FIG. 3 illustrates a flowchart depicting a method 300 by which the wireless device 120 may determine whether to leave a first wireless communications system (e.g., NAN 102) and/or merge with a second wireless communications system (e.g., NAN 100) as discussed above.

The disclosure provides a method of providing the wireless device 120, in wireless communication with other wireless devices 114, 116, and 118 within the NAN 102, a way to seek additional, better, or different services or capabilities within the NAN 100. In an embodiment, the wireless device 120 may remain within the NAN 102 if no superior services are available from another NAN. In another embodiment, the wireless device may depart the NAN 102 if the services provided by another NAN (e.g., the NAN 100) are superior, based on a selected metric. In another embodiment, the wireless device 120 may not elect to leave the NAN 102; instead wireless device 120 may discover other available NANs (e.g., the NAN 102 and the NAN 100) or services and join multiple NANs 102 to participate in the multiple services, where capable.

The method 300 begins with step 302 in which the processor 204 of the wireless device 120 identifies, or otherwise selects, which criteria, or metric(s) 320 (described below) associated with the available NANs will be used to compare services. As noted above, services may be advertised through the use of beacon transmissions from the master device 112 or the master device 118, or other similar communications. Likewise, values for each of the metrics 320 may be identified, determined, or otherwise measured by the processor 204 of the wireless device 120. In an embodiment, such metric 320 values may be provided by an external source, for example, from another wireless device. As discussed below, the wireless device 120 may use the metrics 320 to determine if the wireless device 120 should remain in the present or "first" NAN 102, and/or cease wireless communications with the NAN 102 and join another or "second" NAN 100. As will be discussed more thoroughly below with respect to block 312, the wireless device 120 may not be required to depart the first NAN 102, but actually remain with the first NAN 102 and concurrently join the n$^{th}$ NAN (e.g., the second NAN 100). The metrics 320 can be selected from a plurality of metrics, comprising various characteristics of the available NANs, such as the NAN 100 and the NAN 102.

In an embodiment, one or more of several different metrics 320 within the plurality of metrics may be employed allowing the processor 204 of the wireless device 120 to determine whether to remain in its present NAN 102 or move to a wireless communications system (e.g., NAN 100) having more desirable characteristics or cervices. Specific values for each of the metrics 320 may be determined by the processor 204 independently or identified within incoming transmissions provided by other wireless devices.

In an embodiment, the processor 204 may employ an MPN 320a of the NAN 102 master device (e.g., the master device 118 or the master device 112 (FIG. 1C)), a NAN age 320b of the NAN 100 cluster, a NAN size 320c (or population) of the present NAN 102 cluster as compared to another NAN within range (e.g., NAN 100), a variety, number, or type of NAN services 320d available and capabilities of the second NAN 100 as compared to the present NAN 102 cluster, or a NAN RSSI 320e of the members of the NAN 102 as compared to the NAN RSSI 320e of the NAN 100. In an another embodiment, the metrics 320 can further employ characteristics such as a NAN clock accuracy 320f of the NAN master device, a NAN location 320g (e.g., information regarding the specific location of the members of a NAN 102, 100), or a location of the wireless device 120 (device location) 320h (e.g., the relative mobility of the wireless device 120), among other possible characteristics. The foregoing list of metrics is not intended to be exhaustive, and each metric may be employed alone or in conjunction with other metrics 320 of the associated method 300.

In an embodiment, the MPN 320a of the master wireless device 118 of the NAN 102 cluster is utilized as the selected metric 320. The master device 118 within the NAN 102 may initiate a contention-based process for transmitting a synchronization message during a discovery time interval of a discovery time period. The synchronization message is employed to ensure each device within the NAN 102 is synchronized and capable of sending and receiving data. In an embodiment, one or more synchronization messages can include the MPN 320a. The MPN 320a may be preset or dynamically adjusted based on power stability or other pertinent factors. In an embodiment, the MPN 320a is an indication of the quality of the master device's 118 services, with a higher number generally being a more desirable characteristic. For example, wireless devices with an external power source can set their MPN higher (e.g., 10), whereas wireless devices on battery power may set their MPV lower (e.g., 5). In accordance with the disclosed method 300, the wireless device 120 may compare the MPN 320a of the first NAN master device 118 within the NAN 102 with a second MPN 320a of master device 112 within the NAN 100. The wireless device 120 may depart, or leave the NAN 102 having the master device 118 with the lower MPN in favor of joining the NAN 100 having the master device 112 with the higher MPN. The wireless device 120 may then participate in the NAN 100, taking advantage of the increased quality or level of service associated with the higher MPN 320a.

In an embodiment, the NAN "age" 320b of the NAN may be utilized as the selected metric 320. The synchronization message transmitted by the master device 118 within the NAN 102 may include a timestamp of the master wireless device 118 that the remaining devices within the NAN 102 utilize to synchronize the network. The "age" 320b of the NAN then refers to the time since the first synchronization timestamp (not shown) was transmitted by the master device 118. The NAN age 320b of the NAN 102 cluster can be employed in one of at least two ways: first, an older timestamp can be interpreted by the processor 204 as a sign of increased stability over a longer period of time. Such a circumstance arises where a master device is configured with a stable power supply, such as the master device 118 implemented as a desktop computer having a wired power supply. In an embodiment, this is a desirable characteristic and can be used by the processor 204 determine whether or not to join the NAN 100 with a newer or older timestamp.

In another embodiment, an older timestamp may be less desirable to the wireless device 120 in the event the wireless device 120 seeks new services not offered by the present NAN 102. In such a circumstance, the processor 204 may prefer to join the NAN 100 with a younger timestamp, such as where the master device 112 of the NAN 100 has a younger timestamp. In such an embodiment, the NAN age 320b having a younger timestamp may indicate newer services or more relevant services than the NAN age 320b having an older timestamp. The NAN age 320b may be employed with other metrics concurrently.

In an embodiment, the NAN size 320c of a NAN cluster may be utilized as a metric for determining NAN desirability. Information regarding the NAN size 320c may be received by the processor 204 in a NAN Information Element ("IE") carried in the NAN discovery beacon. The NAN "size" as referred to herein, references the population, or number of associated or participating devices of the NAN 102 as compared to the NAN 100. In the event the wireless device 120 is a member of the NAN 102 having a smaller population, the NAN 102 may have limited services or capabilities due to a smaller population. Accordingly, the processor 204 can seek the NAN 100 having a larger population, shown having five associated devices, not including wireless device 120. The larger population of the NAN 100 may provide the wireless device 120 with additional or different services not offered by the NAN 102. Alternatively, in an embodiment, the NAN 120 having a smaller population may be more desirable to the wireless device 120, providing services to fewer devices. In such an embodiment, the wireless device 120 may have increased access to desired services with fewer competing devices present.

In an embodiment, a number of services 320d offered within the NAN 100 or the NAN 102 may be a further metric 320 by which the processor 204 determines whether to remain with NAN 102 or seek the other NAN 100. The number of services 320d offered is desirable where a wireless device 120 seeks additional or different services not presently available to it within the current NAN 102. The processor 204 can then compare the number of services 320d offered by both the NAN 102 and the NAN 100, determine which NAN has a more desired number or selection of services (as discussed below) and determine whether to remain or depart the NAN 102 in order to participate in the NAN 100. The wireless device 120 may subsequently join multiple NANs as required to use desired services. The wireless device 120 may subsequently join multiple NANs as required to use desired services.

In an embodiment, the NAN RSSI 320e can also be employed as a metric for determining NAN desirability. The NAN RSSI 320e is an indication of signal strength, and accordingly, often an indication of power stability. As referred to herein, while a "NAN" itself may not have an RSSI, the master device 118 or another member device may have an RSSI (e.g., the RSSI of the device providing the service) that provides a useful comparison between the NAN 102 and the NAN 100. Accordingly, a NAN RSSI 320e may be an indication of the signal strength of the master device 118, an indication of the signal strength of an individual member of the NAN (e.g., the laptop 110) or an aggregate or average indication of the collective signal strength of the members of the NAN as realized at the wireless device 120 or at the master device 118. In the event a master device 118 within the NAN 102 has an unstable power supply or where the master device 112 of the NAN 100 has a more stable power supply, the processor 204 may compare the metrics and select the NAN 100 using the disclosed method 300.

In another embodiment, the NAN clock accuracy 320f, the mobility or locations 320g of the NAN 100 or the NAN 102, or the device location or mobility 320h of the wireless device 120 may be utilized as metrics 320 for the determination of the present method 300. The use of these metrics 320 may require the transmission of additional information packets containing coordinates of both the master wireless device 118 and the master device 112 and each client within the NAN 102 and the NAN 100. In addition to the coordinate information, an embodiment further includes a timestamp corresponding to the location data.

For example, the locations of the NAN 100, the NAN 102, and the wireless device 120 may be important because the wireless device 120 may be able to more readily participate in the NAN 100 that is closer than the NAN 102. The wireless device 120 may use its own location 320h in comparison to the location 320g of the NAN to make the selection. In an embodiment, the device location 320g may include mobility information (e.g., speed or velocity) that may allow the wireless device 120 to select between two moving NANs 100, 102. In an embodiment, information regarding mobility (e.g., velocity or speed) or location 320h of the wireless device 120 and/or the NAN location 320g of the NAN 102 and the NAN 100 (and the location of individual members of each of the NANs 102, 100) may also be useful to determine how long the NAN 120 will be in range. If the wireless device 120 is moving and the NAN 102 is stationary, such information may allow the (moving) processor 204 to select a more stable connection with the NAN 100 that will provide more desirable services over a longer period of time with increased link stability. Similarly, the NAN clock accuracy 320f may also be an indication of a stable link providing addition information to the processor 204 of the wireless device 120 for selecting the NAN 102, 100.

In an embodiment, the "location" of a wireless device 120 may be a geographic position defined by a combination of latitude, longitude, elevation, or other pertinent coordinate system. Similarly, the NAN location 320g may also comprise a geographic position of an area defined by the members of the NAN 100 or the NAN 102. Accordingly, the NAN location 320g may comprise a single or plurality of GPS (Global Positioning System) reference points describing an area occupied by the members of the NAN 100, 102, a point within the area, or the extent to which the services offered by the NAN members are available. The location information 320g, 320h may further comprise a speed or velocity component indicating movement of the NAN 100, 102, or the wireless device 120.

In block 304 the processor 204 identifies at least the selected metric 320 for the first NAN 102. In the event that the wireless device 120 is in wireless communication with multiple NANs 102, 100 simultaneously, the processor 204 may compare the services and capabilities of each NAN within range, shown in FIG. 1A-FIG. 1C as the exemplary NAN 100 and the NAN 102, based on the selected metrics.

In block 306, the processor 204 identifies the same metric(s) 320 for the $n^{th}$ NAN (e.g., NAN 100), where n indicates the number of available NANs. In an embodiment, multiple metrics 320 discussed above may be compared to provide the wireless device 120 with the desired NAN service(s).

In block 308, the processor 204 compares the metrics 320 of each of the available NANs (e.g., the NAN 100 and the NAN 102), to determine which of the available NANs may provide better services. The completed comparison at block 308 leads to a decision block 310 wherein the processor 204 determines whether the wireless device 120 should select the first NAN 102 based on the comparison and remain within the first NAN 102 based on the comparison of metrics.

Should the determination at decision block 310 be that the first NAN 102 does not provide the best available services, the wireless device 120 may depart the first NAN 102 at block 314 in favor of superior services in another NAN 100, labeled here as the "$n^{th}$ NAN." The wireless device 120 may then join the $n^{th}$ NAN (e.g., the NAN 100) at block 316. It is to be appreciated that while block 314 and block 316 are shown in order, in an embodiment, the actions described in blocks 314 and 316 may be reversed or completed concurrently, depending on the design and requirements of the wireless device 120.

In an embodiment, the wireless device 120 may periodically or continuously repeat the method 300. This may further allow the wireless device 120 to iteratively compare metrics of already-available NANs or discover new services (described below) as additional new NANs fall within range of wireless device 120 or additional wireless devices join the available NANs.

In an embodiment, if at decision block 310 the processor 204 determines that superior services are not available in the $n^{th}$ NAN according to the compared metrics, the method 300 may select the first NAN 102 and remain with the first NAN 102. This may be because, for example, superior services are not available from other available NANs or the first NAN 102 already provides superior services, according to the compared metrics.

At block 311, the wireless device 120 may discover one or more additional services. The additional service or services may be new services available from the $n^{th}$ NAN, wherein the $n^{th}$ NAN or the associated service was not previously known to the wireless device 120. In an embodiment, the new service may be a service desired by the wireless device. Accordingly, at decision block 312, if the newly discovered service is available, the wireless device 120 may join the $n^{th}$ NAN for the new service at block 216, participating in more than one NAN (e.g., the first NAN 102 and the $n^{th}$ NAN). The method 300 may then be repeated for the new service with the $n^{th}$ NAN.

If at block 311 the processor 204 determines no new or additional services are available or required from another NAN (e.g., the NAN 100 or the $n^{th}$ NAN) then at decision block 312, the wireless device 120 may not join the $n^{th}$ NAN, once again returning to block 302. The method 300 may be completed continuously, allowing the wireless device 120 to continue searching for available services and seeking the best possible NAN to provide desired services.

It is understood that any specific order or hierarchy of steps in any disclosed process is an example of a sample approach. Based upon design preferences, it is understood that the specific order or hierarchy of steps in the processes can be rearranged while remaining within the scope of the present disclosure. The accompanying method claims present elements of the various steps in a sample order, and are not meant to be limited to the specific order or hierarchy presented.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for selecting a neighborhood aware network by a wireless device, the method comprising:
    determining by the wireless device, in response to a first master device of a first neighborhood aware network (NAN) having a first power state comprising being powered by an external power source, a first master preference number (MPN) value for the first NAN, wherein the wireless device is participating in the first NAN;
    determining by the wireless device, in response to a second master device of a second neighborhood aware network (NAN) having a second power state comprising operating on battery power, a second master preference number (MPN) value for the second NAN, wherein each of the first and second master devices are configured to periodically transmit a clock synchronization message to the first NAN and the second NAN, respectively;
    performing, by the wireless device, a first comparison of the first MPN value and the second MPN value; and
    joining, by the wireless device, based at least in part on the first comparison, the second NAN, while maintaining participation in the first NAN.

2. The method of claim 1, wherein each of the first NAN and the second NAN include a first network metric, and wherein performing the first comparison is based on determining a condition of the first network metric for the first and second NAN, respectively.

3. The method of claim 2, further comprising adjusting a time synchronization frame to match a clock of the first NAN or the second NAN.

4. The method of claim 2, wherein the first network metric comprises one of:
    an age of each of the first NAN and the second NAN,
    a number of devices participating in each of the first NAN and the second NAN,
    a plurality of services provided within each of the first NAN and the second NAN, and
    a clock accuracy of either of the first and second master devices.

5. The method of claim 2, wherein the first network metric comprises a location representative of an area defined by respective constituent member devices of each of the first NAN and the second NAN.

6. The method of claim 5, wherein performing the first comparison further comprises comparing the associated area for each of the first NAN and the second NAN to a measure of mobility of the wireless device.

7. The method of claim 2, wherein each of the determined conditions of the first network metric for the first and second NAN indicate a first and second period of time, respectively, that the first NAN and that the second NAN will be within a network range of the wireless device.

8. The method of claim 7, wherein each of the first NAN and the second NAN include a second network metric, and wherein performing the first comparison is further based on determining a condition of the second network metric for the first and second NAN, respectively.

9. The method of claim 8, wherein the second network metric comprises a network velocity, wherein performing the first comparison comprises comparing the associated condition of the associated first network metric and the associated second network metric for the first NAN with the associated condition of the associated first network metric and the associated second network metric for the second NAN, and wherein joining the second NAN is based on the comparison of the associated conditions.

10. The method of claim 1, wherein performing the first comparison is based on comparing an age of the first NAN with an age of the second NAN.

11. The method of claim 1, wherein performing the first comparison is based on comparing a number of devices participating in the first NAN with a number of devices participating in the second NAN.

12. The method of claim 1, wherein performing the first comparison is based on comparing a plurality of services provided within the first NAN with a plurality of services provided within the second NAN.

13. The method of claim 1, wherein performing the first comparison is based on comparing a clock accuracy of the first master device with a clock accuracy of the second master device.

14. A wireless apparatus configured for performing the selection of a neighborhood aware network, the apparatus comprising:
a receiver configured to receive information from at least a first neighborhood aware network (NAN) and a second neighborhood aware network (NAN); and
a processor configured to:
determine, in response to a first master device of the first NAN having a first power state comprising being powered by an external power source, a first master preference number (MPN) value for the first NAN, wherein the wireless apparatus is participating in the first NAN;
determine, in response to a second master device of a second neighborhood aware network (NAN) having a second power state comprising operating on battery power, a second master preference number (MPN) value for the second NAN, wherein each of the first and second master devices are configured to periodically transmit a clock synchronization message to the first NAN and the second NAN, respectively;
perform a first comparison of the first MPN value and the second MPN value; and
join, based at least in part on the first comparison, the second NAN, while maintaining participation in the first NAN.

15. The apparatus of claim 14, wherein each of the first NAN and the second NAN include a first network metric, and wherein performing the first comparison is based on determining a condition of the first network metric for the first and second NAN, respectively.

16. The apparatus of claim 15, wherein the processor is further configured to adjust a time synchronization frame to match a clock of the first NAN or the second NAN.

17. The apparatus of claim 15, wherein the first network metric comprises one of:
an age of each of the first NAN and the second NAN,
a number of devices participating in each of the first NAN and the second NAN, a plurality of services provided within each of the first NAN and the second NAN, and
a clock accuracy of either of the first and second master devices.

18. The apparatus of claim 15, wherein the first network metric comprises a location representative of an area defined by the respective constituent members of each of the first NAN and the second NAN.

19. The apparatus of claim 18, wherein the processor is further configured to compare the associated area for each of the first NAN and the second NAN to a measure of mobility of the wireless apparatus.

20. An apparatus for selecting a neighborhood aware network, the apparatus comprising:
means for determining, in response to a first master device of a first neighborhood aware network (NAN) having a first power state comprising being powered by an external power source, a first master preference number (MPN) value for the first NAN, wherein the apparatus is participating in the first NAN;
means for determining, in response to a second master device of a second neighborhood aware network (NAN) having a second power state comprising operating on battery power, a second master preference number (MPN) value for the second NAN, wherein each of the first and second master devices are configured to periodically transmit a clock synchronization message to the first NAN and the second NAN, respectively;
means for performing a first comparison of the first MPN value and the second MPN value; and
means for joining, based at least in part on the first comparison, the second NAN, while maintaining participation in the first NAN.

21. The apparatus of claim 20, wherein each of the first NAN and the second NAN include a first network metric, and wherein performing the first comparison is based on determining a condition of the first network metric for the first and second NAN, respectively.

22. The apparatus of claim 21, further comprising means for adjusting a time synchronization frame to match a clock of the first NAN or the second NAN.

23. The apparatus of claim 21, wherein the first network metric comprises one of:
an age of each of the first NAN and the second NAN,
a number of devices participating in each of the first NAN and the second NAN,
a plurality of services provided within each of the first NAN and the second NAN, and
a clock accuracy of either of the first and second master devices.

24. The apparatus of claim 21, wherein the first network metric comprises a location representative of an area defined by the respective constituent members of each of the first NAN and the second NAN.

25. The apparatus of claim 24, wherein the means for performing the first comparison further compares the associated area for each of the first NAN and the second NAN to a measure of mobility of the apparatus.

26. A non-transitory, computer-readable medium comprising code that, when executed, causes a wireless device to:
- determine, in response to a first master device of a first neighborhood aware network (NAN) having a first power state comprising being powered by an external power source, a first master preference number (MPN) value for the first NAN, wherein the wireless device is participating in the first NAN;
- determine, in response to a second master device of a second neighborhood aware network (NAN) having a second power state comprising operating on battery power, a second master preference number (MPN) value for the second NAN, wherein each of the first and second master devices are configured to periodically transmit a clock synchronization message to the first NAN and the second NAN, respectively;
- perform a first comparison of the first MPN value and the second MPN value; and
- join, based at least in part on the first comparison, the second NAN, while maintaining participation in the first NAN.

27. The non-transitory, computer-readable medium of claim 26, wherein each of the first NAN and the second NAN include a first network metric, and wherein performing the first comparison is based on determining a condition of the first network metric for the first and second NAN, respectively.

28. The non-transitory, computer-readable medium of claim 27, further causing the wireless device to adjust a time synchronization frame to match a clock of the first NAN or the second NAN.

29. The non-transitory, computer-readable medium of claim 27, wherein the first network metric comprises one of:
- an age of each of the first NAN and the second NAN,
- a number of devices participating in each of the first NAN and the second NAN, a plurality of services provided within each of the first NAN and the second NAN, and
- a clock accuracy of either of the first and second master devices.

30. The non-transitory, computer-readable medium of claim 27, wherein the first network metric comprises a location representative of an area defined by the respective constituent members of each of the first NAN and the second NAN.

31. The non-transitory, computer-readable medium of claim 30, wherein the wireless device is further caused to compare associated area for each of the first NAN and the second NAN to a measure of mobility of the wireless device.

* * * * *